United States Patent [19]
Sakuma et al.

[11] Patent Number: 5,231,656
[45] Date of Patent: Jul. 27, 1993

[54] DEVICE FOR DETECTING FILM INFORMATION

[75] Inventors: Haruhiko Sakuma; Nobuaki Tsuji, both of Hino, Japan

[73] Assignee: Konica Corporation, Tokyo, Japan

[21] Appl. No.: 750,593

[22] Filed: Aug. 28, 1991

[30] Foreign Application Priority Data

Aug. 31, 1990 [JP] Japan .................................. 2-231162

[51] Int. Cl.⁵ .............................................. H05G 1/28
[52] U.S. Cl. ...................................... 378/166; 378/177
[58] Field of Search ............... 378/169, 171, 173, 181, 378/187, 188, 162, 165, 166, 206; 430/570

[56] References Cited

U.S. PATENT DOCUMENTS

| | | | |
|---|---|---|---|
| 3,849,660 | 11/1974 | Hommerin | 250/570 |
| 4,965,628 | 10/1990 | Olliver et al. | 355/41 |

FOREIGN PATENT DOCUMENTS

| | | |
|---|---|---|
| 0300729A2 | 1/1989 | European Pat. Off. . |
| 0432722 | 6/1991 | European Pat. Off. ............ 378/165 |
| 61-32003 | 2/1986 | Japan . |
| 61-80106 | 4/1986 | Japan . |
| 62-3250 | 1/1987 | Japan . |
| 62-123454 | 6/1987 | Japan . |
| 2-68544 | 3/1990 | Japan . |

OTHER PUBLICATIONS

Patent Abstracts of Japan, vol. 13, No. 167, (P-861), Apr. 20, 1989, referring to JP-A-1003731, Jan. 9, 1989.

*Primary Examiner*—David P. Porta
*Assistant Examiner*—Don Wong
*Attorney, Agent, or Firm*—Finnegan, Henderson, Farabow, Garrett & Dunner

[57] ABSTRACT

A film information detecting method for detecting information provided on a film for photography and a device for practicing the same. The film information detecting method includes the steps of irradiating a film information display portion on the film for photography with a light to which the film is not sensitive and detecting the film information. The film information detecting device for detecting information provided on a film for photography includes a light irradiation device for irradiating an information display portion with a light to which the film is not sensitive and a film information detecting device for detecting film information displayed by the film information display portion.

6 Claims, 5 Drawing Sheets

DEVICE FOR DETECTING FILM INFORMATION

BACKGROUND OF THE INVENTION

This invention relates to a film information detecting method for film for photography and a device therefor.

As a means for detecting film information provided directly or indirectly on a raw film before exposure and setting the photographic conditions based on the detected result, in 35 mm film, there has been employed the method in which the sensitivity of the film and other information are displayed in the cartridge for housing the film, or the method in which a plurality of perforations are provided at the film portion exposed externally of the cartridge and the printing conditions onto printing paper are displayed according to the pattern of these perforations. In a sheet X-ray film without use of a cartridge (hereinafter merely called X-ray film), there are various kinds of films depending on the purpose or use, but these methods have not been practiced to display such information on X-ray film. For each kind of X-ray film, conditions of photographing and developing are predetermined ones, but since no film information for this kind of film, etc. is displayed on the film, inadequate conditions, for photography or developing may be sometimes practiced. One may consider to apply a pattern display according to the perforations as mentioned above as the film information display, but such idea will require a perforation device, whereby there will ensue such problems as durability of the device or generation of punching trash. Also, pattern display according to perforation enables no non-contact pattern detection, thus posing a problem in durability of the detecting device. Further, it is impossible to display many types of information by pattern display according to perforations.

SUMMARY OF THE INVENTION

The present invention is intended to provide a film information detecting method for film for photography which can detect the film information display provided on a film, and a device therefor.

The first invention concerns a film detecting method of film for photography, which comprises irradiating a film for photography having a film information display portion displaying film information provided on the surface, with a light to which the film for photography is not sensitive, thereby detecting the film information.

The second invention concerns a film information detecting device of film for photography comprising:
- a light irradiation means for irradiating the film information display portion provided on the surface with a light to which the film for photography is not sensitive, and
- a film information detecting means for detecting the film information displayed by the film information display portion.

BRIEF DESCRIPTION OF THE DRAWINGS

The drawings all illustrate the embodiments of the present invention, in which.

DETAILED DESCRIPTION OF THE EMBODIMENTS

In the following, the embodiments of the present invention are described.

Figure 5:
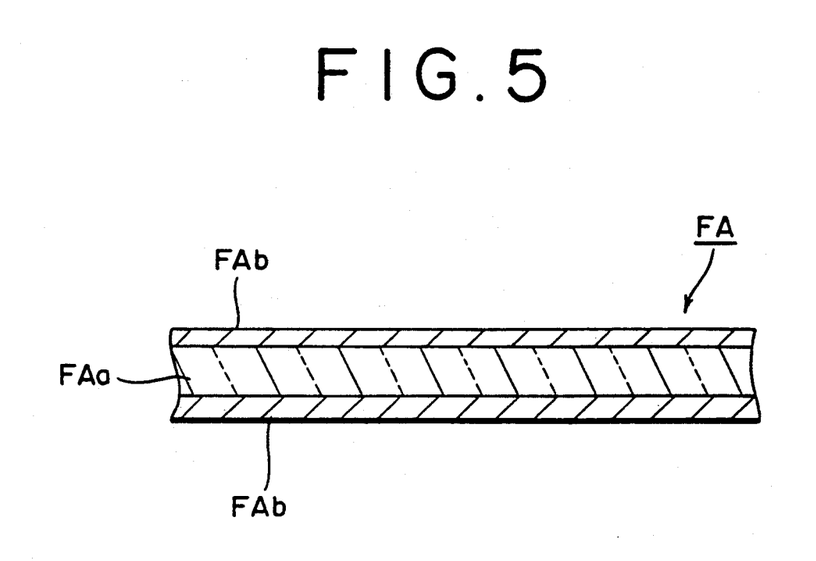
FIG. 5 is an enlarged partial cross-sectional view along the line V—V in FIG. 3.

FIG. 5 is an enlarged partial cross-sectional view of an X-ray film (enlarged sectional view along the V—V line in FIG. 3 described below).

The X-ray film FA generally comprises a base film FAa coated on both surfaces with light-sensitive layers FAb, FAb comprising emulsions of silver halide. The X-ray film is charged one sheet at a time into a vessel called a Kassette to be provided for photographing.

Figure 6:
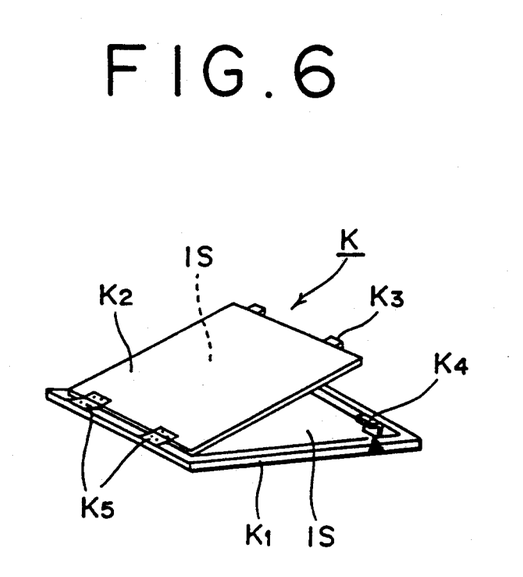
FIG. 6 is a perspective view of a Kassette.

FIG. 6 is a perspective view of a Kassette.

The Kassette K has the structure as described below. The substrate $K_1$ has a lid $K_2$ mounted openably and closably with hinges $K_5$, $K_5$, the substrate $K_1$ is provided with a clasp $K_4$ for keeping the lid $K_2$ closed, and the lid $K_2$ is provided with a nail $K_3$ engaged with the clasp $K_4$. On the upper surface of the substrate $K_1$ and the innerside surface of the lid $K_2$ are respectively plastered intensifying screens IS. Under the state with the lid $K_2$ closed, the X-ray film (not shown) is adapted to be charged in the Kassette K as sandwiched in close contact with the intensifying screens IS, IS. During photography, an X-ray passes through the substrate $K_1$ to reach one of the intensifying screens IS, and further passes through the X-ray film to reach the other (the lid $K_2$ side) intensifying screen IS. Then, the light receiving portion of the intensifying screens IS emits fluorescent light, and the X-ray film is adapted to be exposed with the fluorescent light. Photosensitive layers are provided on both surfaces of the base film as shown in FIG. 5 for the purpose of making deleterious influence on living bodies without making the X-ray intensity high during photographing and to also make clear images. The X-ray film may be manually charged into the Kassette, or otherwise, as described below. In reference to FIG. 4, X-ray film may be sometimes housed in a large number of sheets in a supply magazine (SM), from which it is taken out one sheet by one sheet to be charged into the Kassette in FIG. 6 and provided for photography.

Figure 3:
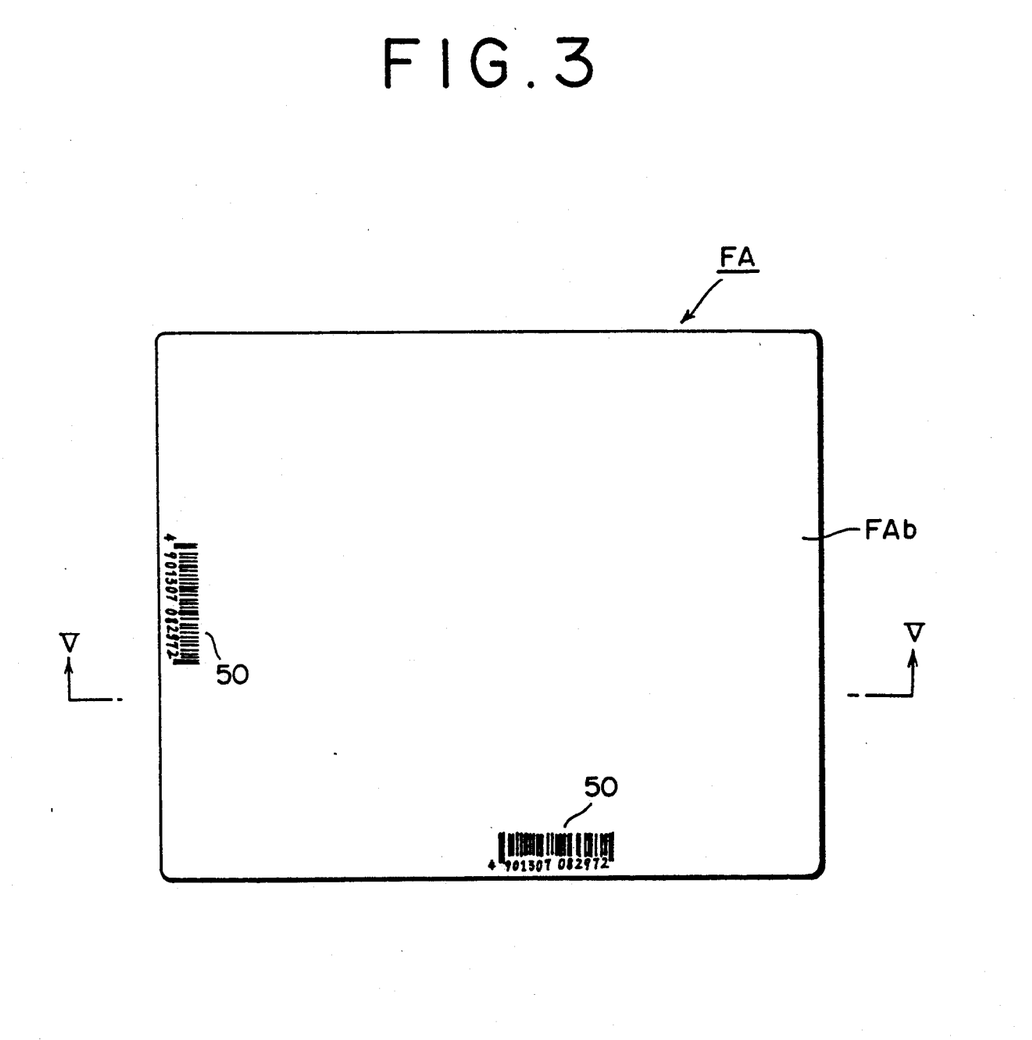
FIG. 3 is a plan view of X-ray film.

What should be noted in the present embodiment is that a bar code 50 for displaying the film information such as the kind of film, etc. is provided on a part of the peripheral portion of the X-ray film FA, as shown in FIG. 3. The bar code 50 receives irradiation of light to which the X-ray is not substantially sensitive, and the reflected light enters the bar code reader to detect the film information. Since the light-sensitive wavelength region of X-ray film is generally 300 to 590 nm, the light for irradiating the bar code may be suitably have a wavelength of about 600 nm to 1 mm. Also, there is a film for recording with a semiconductor laser beam of 820 nm, and in a device using such film, it is preferable to use an irradiation light with a wavelength of 900 nm to 1 mm.

Figure 1:
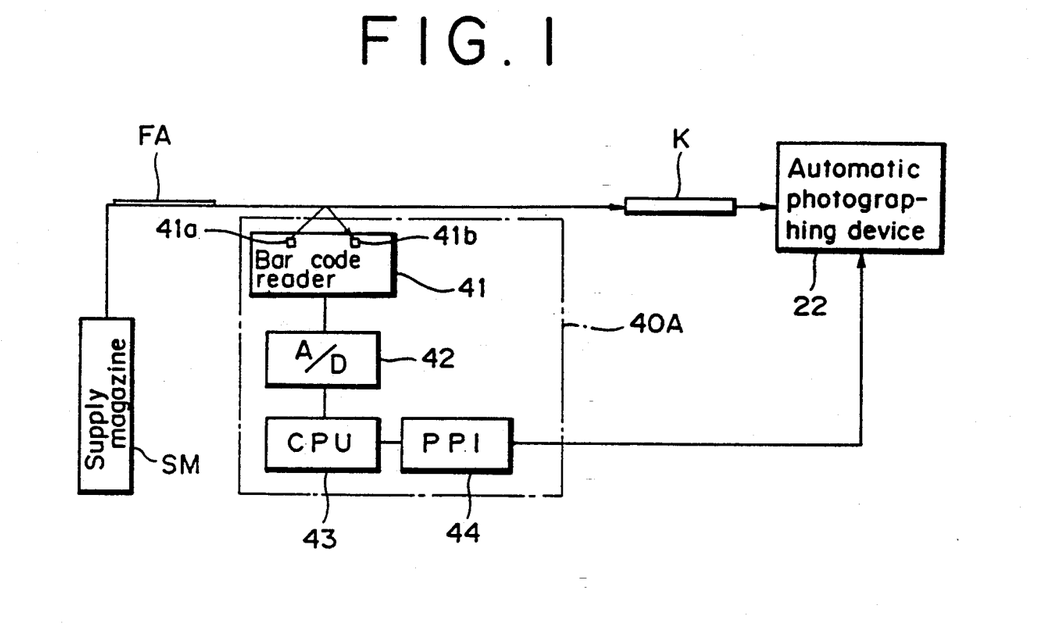
FIG. 1 is a block diagram showing the outline of the setting mechanism of photographic conditions.

FIG. 1 is a block diagram showing the outline of a mechanism for detecting the film information displayed by the bar code 50 (FIG. 3), sending the signals based on the detection result and setting adequate photography conditions.

The unused X-ray film FA housed in a supply magazine SM is taken out one sheet by one sheet to be charged into the Kassette K. In the conveying route from the supply magazine (SM) of the unused X-ray film FA to the Kassette K, the bar code 50 receives irradiation of IR-ray (emitted from the IR-ray emitting element 41a of the bar code reader and read by the light receiving element 41b of the bar code reader 41, the analog signal read is converted to the digital signal by the A/D convertor 42 to be inputted in the central processing unit (CPU) 43. The signal processed in CPU 43 is inputted through the peripheral interface (PPI) 44, which is an interface between the mechanism for detecting film information and any peripheral devices, to the automatic photographing device 22, and the photographing device 22 sets automatically the commanded photographing conditions. The film information detecting device 40A is constituted of the bar code reader 41, the A/D convertor 42, CPU 43 and the peripheral interface 44.

Figure 2:
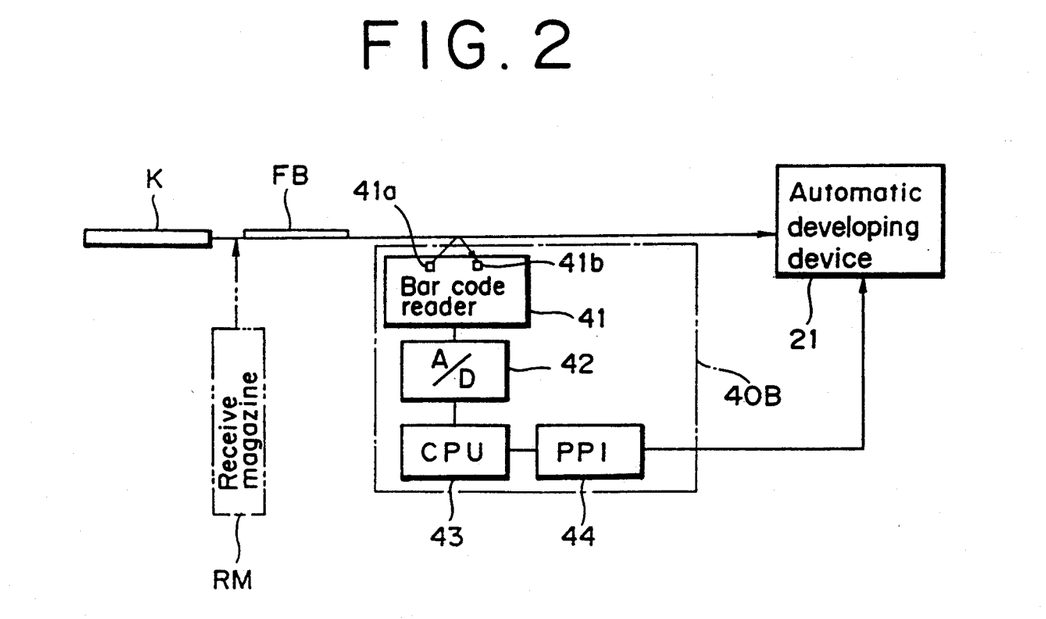
FIG. 2 is a block diagram showing the outline of the setting mechanism of developing conditions.

FIG. 2 is a block diagram showing the outline of the mechanism for carrying out the same film information detection as described above for the photographed X-ray film and setting adequate developing conditions on the developing device based on the detected result.

The photographed X-ray film FB taken out from the Kassette K and conveyed has the film information detected by the film information detecting device 40B similarly as in FIG. 1, and the automatic developing device 21 which has received the output signals from the detecting device 40B sets automatically the adequate developing conditions.

Conditions of photographing, developing are set rapidly.

Figure 4:
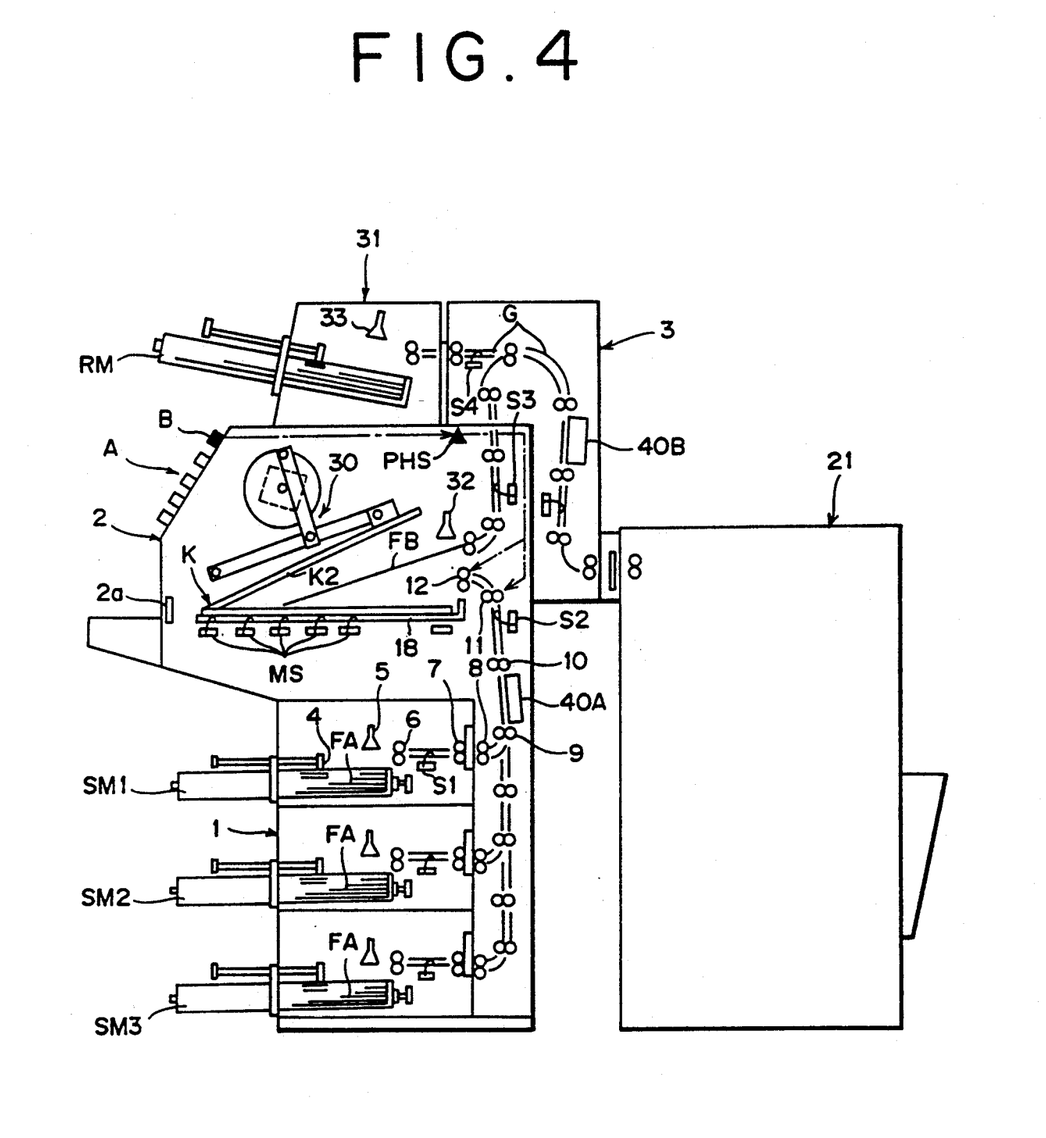
FIG. 4 is a whole schematic view of the film charging, recovering device equipped with an automatic developing device and a film conveying device.

FIG. 4 is an internal schematic view of the whole device having the film conveying, charging, recovering device connected to the developing device.

First, the film charging, recovering device is explained. This device is sectionalized into three compartments. In the supply portion 1 is mounted a supply magazine SM housing a large number of unused X-ray films FA. FIG. 4 shows that three kinds of supply magazines $SM_1$ to $SM_3$ are used to house films with different sizes. The central portion 2 is provided for inserting the unused film FA into the Kassette K and taking out the photographed film FB from the Kassette K. The upper part 3 is a device for conveying photographed film provided for delivering the photographed film F taken out from the Kassette K via the microswitch $S_3$, guide G to the developing device 21 side.

Next, actuation of the device is explained. For example, when the supply magazine $SM_1$ is mounted in the compartment 1 of this device, the shutter 4 of the supply magazine $SM_1$ is opened, one sheet of the film at the uppermost housed within the supply magazine $SM_1$ is automatically attracted by a sucking disk 5, and conveyed to the place where one side thereof is sandwiched between the rollers 6. The film sandwiched between the rollers 6 is conveyed by rotation of the rollers 6 to push the microswitch $S_1$. By actuation of the switch $S_1$, the rotation of the rollers 6 stops, whereby the film enters a waiting state.

When the Kassette is inserted from the Kassette take-in and take-out inlet 2a into the central portion 2, the detector Ms provided beneath the Kassette receiving plate 18 detects the size of the Kassette, and emits the signal to the supply portion. When the film size of the supply magazine $SM_1$ is chosen by this signal, the film waiting between the rollers 6 and the rollers 7 is conveyed by the rotations of the rollers 7, 8, 9, 10 to push the microswitch $S_2$, and waits until the lid of the Kassette K is opened at this place. The reason why the film is conveyed to the place where the microswitch $S_1$ is located before the lid of the Kassette is opened is because the time for charging the film into the Kassette should be as short as possible.

When the lid $K_2$ of the Kassette K is opened by the lid opening and closing mechanism 30, the rollers 11, 12 rotate, whereby the film is charged into the Kassette K. When the film is charged into the Kassette K, the lid of the Kassette K is closed, discharged outside and the Kassette K is now in condition to be used for photographing. When after photographing the Kassette K is mounted at the central portion 2 of the device, the lid of the Kassette K is opened and the photographed film FB is delivered out via the guide G according to the same mechanism in which the unused film is taken out and conveyed from the supply magazine $SM_1$. The photographed film FB, instead of being delivered to the automatic developing device 21 as described above according to the known system, may be also conveyed to the compartment 31 where the receive magazine RM on the compartment 2 is mounted and delivered into the receive magazine RM.

The Kassette K from which the photographed film has been taken out is again charged with an unused film and provided for photography.

During the period when photography is performed, this device repeats the actuations as described above. Also, when the photographed film is delivered into the receiving magazine RM as described above (or separately the receive magazine charged with the photographed film is mounted in the compartment 31), the sucking disk 33 can be actuated to convey the film through the photographed film conveying device 3 into the automatic developing device 21 and effect developing therein.

Opening and closing of the lid $K_2$ of the Kassette K are done by engagement and release between the clasp $K_4$ and the nail $K_3$ in FIG. 6 according to the combined mechanism of a known cam mechanism and link mechanism.

Between the rollers 9, 10, the film information detecting device 40A in FIG. 1 is arranged, and the film information displayed by the bar code is detected as described above. Based on the detection result the photographing device (22 in FIG. 1) is set at adequate photographing conditions. Thus, the unused film FA is provided for photography under necessarily adequate conditions, whereby ideal photography is done.

The photographed film FB, in the process of being conveyed via the guide G, has the film information detected by the film information detecting device 40B in FIG. 2 similarly as described above, and based on the detection result the automatic developing device 21 is set at adequate developing condition. Thus, the photographed film FB is developed under necessarily adequate conditions, whereby ideal developing is done.

Also, since the conditions of photography and developing are set automatically and rapidly, these operations are fulfilled efficiently.

The lid $K_2$ of the Kassette K is opened regardless of the presence or absence of the film therein. When the presence of the film is confirmed by the detecting sensor PHS provided at the upper part of the central portion 2, the sucking disc 32 actuates to recover the film and convey it to the photographed film conveying device 3 or the receiving magazine RM. However, when the detecting sensor PHS detects that there is no film in the Kassette K, the sucking disk mechanism 32 will not actuate, and an unused film will be immediately charged from the supply magazine SM, etc. In the device shown in FIG. 4, the operation portion A provided in the front surface of the central portion 2 is provided with a push button B only for charging, a vacant Kassette K is inserted, and when the push button B is pushed, an unused film is immediately charged into the Kassette regardless of the output of the detecting sensor PHS of film presence or absence. For permitting such actuation to be effected, by pushing the pushing button B, as shown by the dotted chain in FIG. 4, the signal of no film may be immediately outputted from the detecting sensor PHS to drive the driving rollers 11, 12 and deliver out the waiting film into the film Kassette K. This can be practiced by use of a logic circuit or a microcomputer.

In the compartment 31 in FIG. 4, the same number of receiving magazines as that of supply magazines can be housed. After photography classifying, for example, the kinds based on the detection result by the film information detecting device 40B occurs and housed in the receiving magazine.

Figure 7:
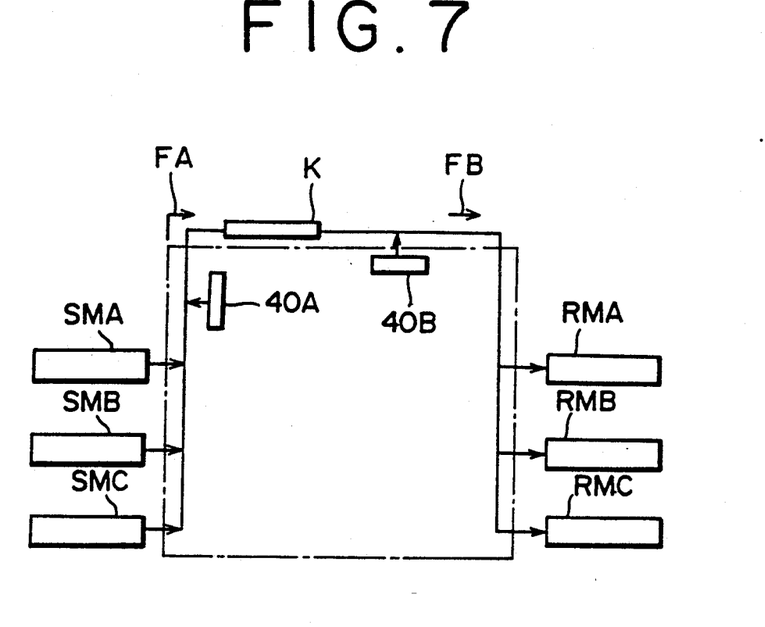
FIG. 7 is a schematic view of film conveying showing the manner of classifying the kinds of the film.

FIG. 7 is a schematic view of film conveying showing the manner of such classification.

In a plurality (three in this embodiment) of supply magazines SMA, SMB and SMC, three kinds of unused X-ray films are housed separately according to the types. The unused film FA conveyed as shown by the arrowhead from the supply magazine SMA, SMB or SMC has the film information detected at the film information detecting device 40A and charged into the Kassette K to be provided for photography. The photographed film FB is taken out from the Kassette K, conveyed as shown by the arrowhead, classified by a classifying device not shown based on the detection result from the film information detecting device 40B, and housed in the receiving magazines RMA, RMB and RMC separately according to the kinds. When a predetermined number of sheets of photographed films are housed in the receive magazine RMA, RMB or RMC, the photographed films are successively (or at one time) conveyed from each receiving magazine to the automatic developing device 21 in FIG. 4 to be developed therein.

Thus, the automatic developing device can develop a large number of sheets of films under the same conditions set by the film information detecting device 40B, whereby developing can be fulfilled efficiently.

Figure 8:
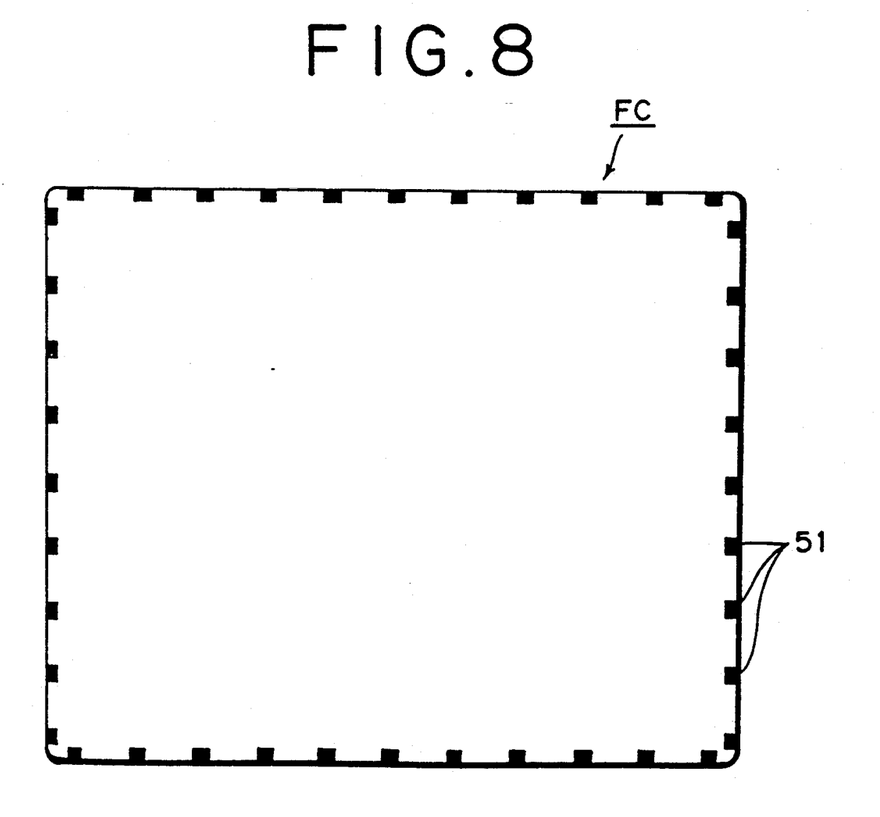
FIG. 8 is a plan view of X-ray film according to another example.

Display of the film information can be done by other suitable display other than by way of bar code. FIG. 8 shows an example of such displays, and a large number of dot-like colored portions 51 are arranged at the peripheral of the X-ray film FC, and the film information is displayed by the arrangement positions of the respective colored portions 51. Also in this example, similarly as the film information displayed by bar code, the arrangement pattern of the colored portions 51 is read by irradiation of IR-ray to detect the film information, and the conditions of photography, developing are set similarly as in the embodiment as described above.

The bar code 50 in FIG. 3 and the colored portion 51 in FIG. 8 are optically read by a reading device such as bar code reader, etc. Therefore, these displays are required to be different in absorbance of light from the film surface. Absorbance of the light at the pattern display portion may be either smaller or larger than that at the film surface. Also, the reflectance may be changed by making the smoothness different from that of the film surface.

As the dye for pattern display, the composition represented by the following formula [I] disclosed in Japanese Unexamined Patent Publication No. 68544/1990 is suitable.

Formula [I]

(wherein $R^1$, $R^2$ may be identical or different and each represent a substituted or unsubstituted alkyl group; $Q^1$, $Q^2$ each represent a benzo-fused ring or a naphtho-fused ring; with proviso that the above $R^1$, $R^2$ and $Q^1$, $Q^2$ have a group substituted with at least 3 sulfonic acid groups or carboxylic acid groups as the dye molecule; L represents a substituted or unsubstituted methine group; and X represents an anion; and n represents an integer of 1 or 2).

Otherwise, the composition shown below can be used as the dye for pattern display.

At least one composition represented by the following formula [II] disclosed in Japanese Unexamined Patent Publication No. 123454/1987:

Formula [II]

(wherein $R^1$, $R^2$, $R^3$, $R^4$, $R^5$ and $R^6$ may be either identical or different and each represent a substituted or unsubstituted alkyl group; $Z^1$ and $Z^2$ each represent a group of non-metallic atoms necessary for formation of a substituted or unsubstituted benzo-fused ring or naphtho-fused ring; with proviso that $R^1$, $R^2$, $R^3$, $R^4$, $R^5$, $R^6$, $Z^1$ and $Z^2$ represent a group which enables the dye molecule to have at least three acid groups; L represents a substituted or unsubstituted methine group; X represents an anion; n is 1 or 2, and 1 when forming a dye intramolecular salt).

At least one of the compositions represented by the following formulae [III], [IV] or [V] disclosed in Japanese Unexamined Patent Publication No. 80106/1986:

Formula [III]

Formula [IV]

Formula [V]

(wherein [Cat$_1$] to [Cat$_3$] represent cations necessary for making the complexes neutral, and M$_1$ to M$_3$ nickel, palladium or platinum; R$^1$ and R$^2$ each represent hydrogen atom, a substituted or unsubstituted alkyl group or a substituted or unsubstituted aryl group, and R$^1$ and R$^2$ may be either the same or different; R$^4$ and R$^5$ each represent hydrogen atom, a halogen atom, cyano group, hydroxyl group, an alkyl group group, aryl group, cycloalkyl group or heterocyclic group which may also have a divalent linking group interposed between the benzene ring bonded, or a group of nonmetallic atoms for formation of of a 5-membered or 6-membered ring by mutual bonding between R$^4$ and R$^5$, and R$^4$ and R$^5$ may be either identical or different).

At least one of the compositions represented by the following formula [VI] disclosed in Japanese Unexamined Patent Publication No. 3250/1987:

Formula [VI]

(wherein R$^1$ represents a substituted or unsubstituted alkyl group, a substituted or unsubstituted aryl group or a substituted or unsubstituted heterocyclic group; R$^2$ and R$^5$ may be either identical or different, and each represent hydrogen atom or a group substitutable therewith; R$^3$ and R$^4$ may be either identical or different, and each represent a halogen atom, a substituted or unsubstituted alkoxy group, or a substituted or unsubstituted alkyl group; R$^6$ and R$^7$ may be either identical or different, and each represent a substituted or unsubstituted alkyl group, a substituted or unsubstituted aryl group, an acyl group, sulfonyl group, or a group of nonmetallic atoms necessary for formation of a 5-membered or 6-membered ring by mutual linking between R$^6$ and R$^7$; with proviso that at least one of the groups represented by R$^1$, R$^2$, R$^3$, R$^4$, R$^5$, R$^6$ or R$^7$ has sulfo group or its salt or carboxyl group or its salt as the substituent).

At least one kind of the compositions represented by the following formula [VII] disclosed in Japanese Unexamined Patent Publication No. 32003/1986:

Formula [VII]

(wherein M represents Cu, Co, Ni, Pd or Pt; Cat a cation for neutralizing the complex; R1, R2, R3 and R4 each represent hydrogen atom, amino group, a halogen atom, cyano group, hydroxyl group, or an alkyl group, aryl group or heterocyclic group which may also have a divalent linking group interposed between the benzene ring bonded, and also at least one of these groups is an electron donative group, and these may be either identical or different).

The display pattern, in addition to the above-mentioned IR-ray absorptive dyes, may be also provided with an appropriate dye, pigment, carbon black, metal oxide or metal foil depending on the film or the light source. Further, it is also possible to utilize an unevenness by engraving, change in surface reflectance by heat of 500° to 600° C.

The code pattern or discrimination mark can either remain or not remain after the developing processing, which may be also provided in the preparation steps, or the user can also provide a discrimination mark of his own depending on the purpose. Especially, in recent years, on account of widely spread personal computers, the information which is desired to be given to the film can be easily converted to bar code. As the printer for this purpose, it can be practiced according to the system by transfer with an ink ribbon, the ink jet system, the system of coating a liquid, the system of writing with a thermal head of great power. In the case of engraving, there may be employed the non-contact system by printing with a laser beam, or an unevenness may be also provided by pressure. It is also possible to plaster a product prepared previously on a seal.

For the light source for irradiation of a display pattern, typically a semiconductor laser, a laser beam such as He-Ne laser, etc., various diodes and also bulbs of tungsten light source or various fluorescent lamps, etc. can be used depending on the purpose. For detection of halide photographic photosensitive materials, it is preferable to use a light source having a maximum wavelength in the range of 600 to 1100 nm so that there may be no influence on the photosensitive material.

The discrimination symbol provided on the film surface should be preferably read with reflected light, but it may be also detected with permeated light depending on the purpose.

As the optical detection means, a phototransistor, etc. is preferable in the case of an emission diode. In the case of a laser beam, it is preferable to use a bar code reader which has been employed in recent registers.

Since the bar code pattern or discrimination mark is discriminated merely by the difference in position, size and shape of the mark, the user can freely choose it depending on the purpose. Further the user can also provide additionally a different mark, etc. Particularly when used for medical purpose, the information concerned on the diagnosis card, etc. may be recorded on the film as the bar code, whereby it can be an effective means also in medical therapy management. Also, in the case of X-ray film, by providing a discrimination symbol of the photographing date or photographing conditions, etc. under the state of raw film, it becomes possible to automatically set the photographing conditions or show clearly the optimum conditions to one to be photographed, whereby photographing mistake or mistake of the film after photographing, etc. can be prevented. For that purpose, it is preferable to provide the display pattern writing devices at the two places so that the operator can make avail of the display pattern in both before and after the developing processing.

Having described the embodiment of the present invention by referring to X-ray film, it is apparent that the present invention is similarly applicable to films for photography other than X-ray film.

The present invention is adapted to detect the film information by irradiating the film information display portion for displaying the film information of a film for photography with a light to which the film for photography is not substantially sensitive, and therefore processing (e.g. photographing or developing) can be applied on the film for photography under adequate conditions. As the result, erroneous setting of the above processing conditions can be surely prevented, and the visible image obtained can be guaranteed to be always good. Moreover, setting of the above processing conditions can be easily done automatically and rapidly, and by doing so the above processing can be efficiently fulfilled.

We claim:

1. A film information detecting device for detecting film information on an information display portion disposed on a surface of an undeveloped film for photography, comprising:

light irradiation means for irradiating the information display portion with a light having a wavelength to which the undeveloped film is not sensitive, which wavelength is within the range of 600 nm to 1 mm; and information detecting means for detecting film information displayed by said film information display portion.

2. The device of claim 1 wherein said film is a sheet of X-ray film.

3. The device of claim 1 wherein said light is a light having a wavelength of 900 nm to 1 mm.

4. The device of claim 1 wherein said information detecting means comprises a bar code reader, an A/D convertor, and a central processing unit.

5. A film information detecting device for detecting film information on an information display portion provided on a surface of an undeveloped film for photography, comprising:

light irradiation means for irradiating the information display portion of said undeveloped film with a light having a wavelength to which the undeveloped film is not sensitive, which wavelength is within the range of 600 nm to 1 mm;

film information detecting means for detecting film information displayed by said information display portion; and information processing means for processing said film information in order to create an exposure or a development condition depending upon said undeveloped film.

6. A film information detecting device for detecting film information on an information display portion provided on a surface of an undeveloped film for photography, comprising:

an information display portion provided on a surface of said undeveloped film;

light irradiation means for irradiating the information display portion of said undeveloped film with a light having a wavelength to which the undeveloped film is not sensitive, which wavelength is within the range of 600 nm to 1 mm;

film information detecting means for detecting film information displayed in said information display portion wherein the information display portion is comprised of a dye from at least one of the dyes represented by the following Formulae (I) to (VII)

wherein $R^1$, $R^2$ may be identical or different and each representing either a substituted or unsubstituted alkyl group; $Q^1$, $Q^2$ each represent a benzo-fused ring or a naphtho-fused ring, the above $R^1$, $R^2$ and $Q^1$, $Q^2$ having a group substituted with at least 3 sulfonic acid groups or carboxylic acid groups as a dye molecule; L represents a substituted or unsubstituted methine group; and X represents an anion, and n represents an integer of 1 or 2;

wherein $R^1$, $R^2$, $R^3$, $R^4$ $R^5$ and $R^6$ may be identical or different and each representing either a substituted or unsubstituted alkyl group; $Z^1$ and $Z^2$ each representing a group of non-metallic atoms necessary for formation of a substituted or unsubstituted benzo-fused ring or naphtho-fused ring, with $R^1$, $R^2$, $R^3$, $R^4$, $R^5$, $R^6$, $Z^1$ and $Z^2$ representing a group which enables the dye molecule to have at least three acid groups; L represents a substituted or unsubstituted methine group; X represents an anion; n is 1 or 2 when forming a dye intramolecular salt;

(V)

wherein [Cat₁] to [Cat₃] represent cations necessary for making the complexes neutral, and M₁ to M₂ nickel, palladium or platinum; R¹ and R² each representing a hydrogen atom, a substituted or unsubstituted alkyl group or a substituted or unsubstituted aryl group, and R¹ and R² may be either the same or different; R⁴ and R⁵ each represent a hydrogen atom, a halogen atom, cyano group, hydroxyl group, an alkyl group, aryl group, cycloalkyl group or heterocyclic group which may also have a divalent linking group interposed between the benzene ring bonded, or a group of none metallic atoms for formation of a 5-membered or 6-membered ring by mutual bonding between R⁴ and R⁵ and R⁴ and R⁵ may be either identical or different;

(VI)

wherein R¹ represents a substituted or unsubstituted alkyl group, a substituted or unsubstituted aryl group or a substituted or unsubstituted heterocyclic group, R² and R⁵ may be either identical or different, and each representing either a hydrogen atom or a group substitutable therewith; R³ and R⁴ may be either identical or different, and each represent a halogen atom, a substituted or unsubstituted alkoxy group, or a substituted or unsubstituted alkyl group; R⁶ and R⁷ may be either identical or different, and each represent a substituted or unsubstituted alkyl group, a substituted or unsubstituted aryl group, an acyl group, sulfonyl group, or a group of nonmetallic atoms necessary for formation of a 5-membered or 6-membered ring by mutual linking between R⁶ and R⁷, with at least one of the groups represented by R¹, R², R³, R⁴, R⁵, R⁶, or R⁷ having a sulfo group or its salt or carboxyl group or its salt as the substituent;

(VII)

wherein M represents Cu, Co, Ni, Pd or Pt; Cat a cation for neutralizing the complex; R1, R2, R3 and R4 each represent a hydrogen atom, an amino group, a halogen atom, a cyano group, hydroxyl group, an alkyl group, aryl group or an heterocyclic group which may also have a divalent linking group interposed between the benzene ring bonded with at least one of these groups being an electron donative group, and these being either identical or different; and information processing means for processing said film information in order to create an exposure or a film development condition depending upon said information.

* * * * *